Patented Feb. 14, 1939

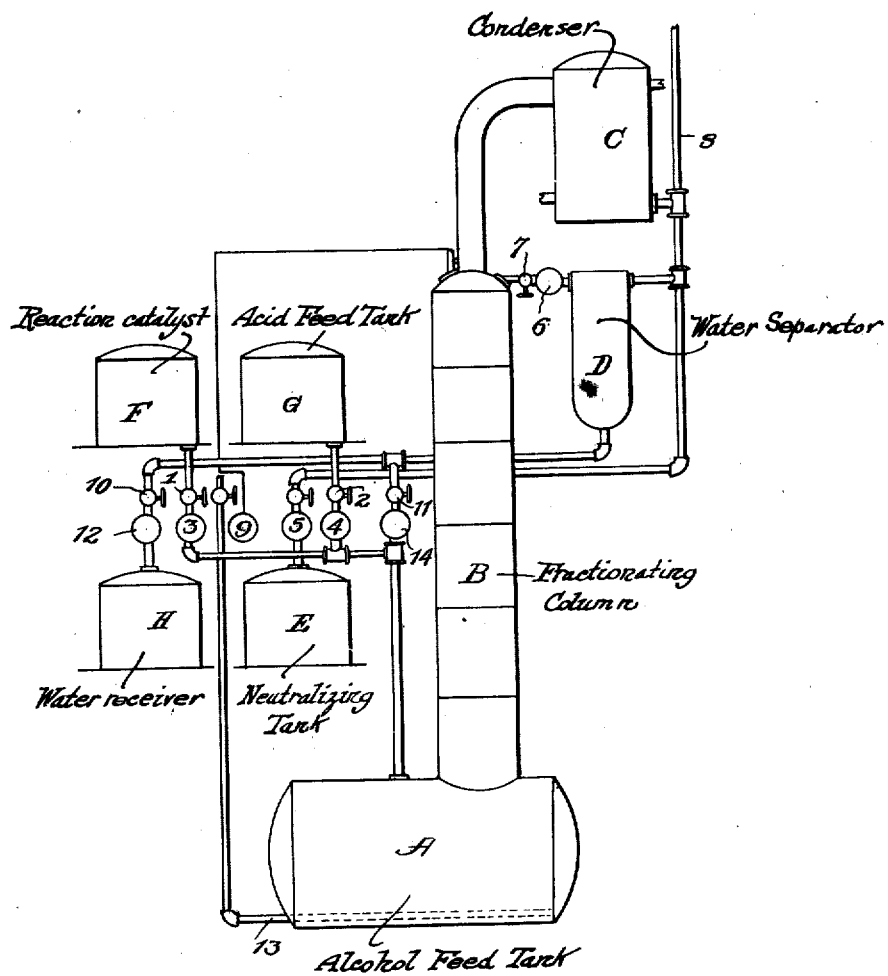

2,147,341

UNITED STATES PATENT OFFICE 2,147,341

PROCESS FOR THE MANUFACTURE OF ESTERS

Joseph F. Harrington, Highland Park, Ill.

Application September 16, 1930, Serial No. 482,306

22 Claims. (Cl. 260—488)

This invention relates to the art of making esters by a process that may be run continuously and the following is a clear and exact description.

It has been known for some time that esters may be made by mixing together an alcohol and aliphatic acid to be esterified, such as acetic acid, together with a large quantity of sulphuric acid as a catalyst and upon heating the esterification is promoted and the ester may be removed from the reaction still by distillation. This process works with a fair degree of satisfaction but it is noticeable that with secondary alcohols and certain iso-alcohols there is considerable decomposition particularly with those alcohols of more than two carbon atoms.

To prevent such decomposition it is necessary to have a process which controls the various factors affecting the reaction. It is the purpose of my invention to provide a method whereby either primary or secondary alcohols may be esterified with practically equal facility, producing very high yields of ester with practically no decomposition. Moreover the advantage of my invention is that the process can be operated continuously although if desired the same process can be adapted to a batch process.

The success of my invention is based upon a correct correlation of the various factors entering into the esterification of alcohols with aliphatic acids, which factors I find to be as follows:

1. Time of esterification.
2. Quantity of catalyst.
3. Concentration of catalyst.
4. Law of mass action.
5. Amount of water present in the reaction mixture.
6. Temperature control of distillation.

All of these factors are inter-related one with another and as the result produced depends thereon it is essential that a control be established so as to maintain them in correct correlation. This is absolutely necessary as in an industrial operation running continuously, such a control must be maintained at all times.

As I will disclose later it is the purpose of my invention to start the esterification process in a reaction still containing five to ten volumes of aliphatic acid in proportion to the volume of alcohol and to feed continuously to the reaction still a supply of aliphatic acid and alcohol in approximately theoretical proportions, and to remove simultaneously a proportionate quantity of ester, alcohol and water in the distillate. It is obvious that under such a process the time of contact of the alcohol and aliphatic acid in the reaction still must be sufficient to develop the ester which is being continuously removed.

Now it is well known that an alcohol and aliphatic acid react very slowly in the absence of a suitable accelerator such as a highly ionized mineral acid or other material, which accelerator may for the purpose of designation be termed a catalyst. I have found that in the operation of my process an extremely small amount of catalyst is entirely inadequate to promote the esterification in the time period allowed under the conditions of operation. I have tried for example such small percents of concentrated sulphuric acid as .1% to .5% by volume on the total charge of esterification components in my process and the distillate produced is of very low ester value and entirely unsatisfactory from the standpoint of industrial operation.

In the production of primary or secondary butyl acetate from acetic acid and the corresponding alcohol, I have found that a proper concentration of catalyzer depending on the strength of acetic acid in the reaction kettle is necessary to develop the desired degree of esterification in the time period allowed, yet this concentration must not exceed certain definite limits, or decomposition due to dehydration of the alcohol will result. For example, using acetic acid of 70% strength the quantity of sulphuric acid should be a minimum of 1.7% and a maximum of 3% by volume of the esterification components: for 80% acetic acid the quantity of sulphuric acid should be a minimum of 1% and a maximum of 1.8% by volume of the esterification components; using 90% acetic acid, the quantity of sulphuric acid should be a minimum of .7% and a maximum of 1.5% by volume of the esterification components; the lower limit is required to produce ester concentration of at least 85% and the higher limit is necessary to prevent decomposition. Likewise in the case of amyl acetate, primary or secondary, I have found that the strength of acetic acid and concentration of sulphuric acid to be required corresponding to the above for the butyl acetates and with the same approximate limits. In the case of isopropyl acetate, I have found there is less tendency to decomposition at or near the above stated higher limits and these may therefore be somewhat exceeded. The lower limit is required in order to produce an ester of at least 85%, and with isopropyl acetate I prefer to operate at about the mean of the upper and lower limits.

It is evident that the percent of sulphuric acid used depends upon the strength of acetic acid available for use. Commercial acetic acid as made from acetate of lime is usually not over 80% strength and is commonly used for esterification. Higher strengths are available and may be advantageously used in my process. It is evident however that the strength of acetic acid available for use controls the percent of sulphuric acid that may be used to best advantages. Having added to the reaction kettle the proper percent of sulphuric acid, the strength of acetic acid in the kettle is controlled between the limits above by a method that will be disclosed later.

I have also found that in place of using highly ionized mineral acids I can also use corresponding percents by weight of certain salts such as sodium bisulphate, potassium bisulphate, sodium or potassium acid phosphate and similar salts.

It is evident therefore that to develop the required esterification in the time period allowed, it is necessary to use a large quantity of catalyst. On the other hand such a large quantity of catalyst would ordinarily promote dehydration and decomposition, especially in the case of secondary alcohols if means were not found for controlling the strength or concentration of such catalyst. This is accomplished by maintaining at all times in the reaction still a large volume of water. The water destroys the dehydration effect that would otherwise take place due to the strong mineral acid or other catalyst. The amount of water maintained depends upon the particular alcohol and the percent of catalyzer. In general with higher alcohols such as butyl or amyl alcohol, primary or secondary, I prefer to maintain from 10 to 40% of water by volume in the reaction still in respect to the total volume of materials in the reaction still. Preferably the water content will be about 15–25%. With isopropyl alcohol which is less subject to decomposition as compared to the higher alcohols, I find it preferable to maintain from ten to thirty percent of water present, operating usually with about 15–25% but using a higher concentration of catalyzer.

The presence of such a large amount of water would ordinarily impair the esterification process. The effect of this water however is offset in another way by taking advantage of the law of mass action. A small volume of alcohol in contact with a large volume of aliphatic acid will esterify the alcohol to a very large degree. The same is true vice versa as a small volume of aliphatic acid in contact with a large volume of alcohol will esterify the acid to a large degree. However since it is more desirable to remove the ester in the form of a constant boiling mixture consisting essentially of ester, alcohol and water, I find it preferable to use a substantial excess, say eight to ten times by volume of aliphatic acid in respect to the volume of alcohol in the reaction still, and to maintain approximately such proportions throughout the operation. The ratio of eight to ten volumes of aliphatic acid in respect to the volume of alcohol does not need to be strictly maintained as I find the process works with a ratio of upwards of about five to one, but I prefer to operate at the ratio of eight or ten to one.

In order to control the amount of water present in the reaction still I provide a means in the reflux line between the condenser and the fractionating column to withdraw the water from the ester, alcohol and water mixture in the distillate, either removing water from the system as with lower esters or removing a part of the water and feeding another part of the water back to the reaction still in the case of higher esters, which separate a very large proportion of water. In either case I so manipulate the water regulation as to maintain the water in the reaction still at an approximately constant value, namely as set forth above.

By means of the reflux line, feeding back part of the distillate to the top of the fractionating column in the usual manner of distillation processes, the temperature of distillation must be maintained under definite control. Under correct temperature control the distillate may be brought over as a mixture of ester, alcohol and water, the ester being of a higher percent and with efficient fractionation practically neutral. The required temperature control changes with the respective alcohols undergoing esterification. But I have found a very satisfactory result with temperature at the top of the fractionating column as follows: isopropyl acetate 75–77° C., secondary butyl acetate 83–86° C., primary butyl acetate 89–91° C., isobutyl acetate 86–89° C., amyl acetate 90–95° C. A variation of several degrees is allowable although I find the acidity of the distillate rises with increasing temperature above those indicated. The distillate is comprised of a mixture of ester, alcohol and water, with only small amounts of aliphatic acid, depending on the efficiency of the fractionating equipment. The distillate is neutralized with a solution of caustic soda or soda ash, dried over calcium chloride if desired and redistilled in the usual manner in a finishing still. The first portions of distillate from the finishing still run wet, but after dryness is obtained the material is cut to a tank for finished material. The water from the neutralizing tanks and calcium chloride tanks and water separated from the water operating still carry some entrained alcohol and ester and these waters can be distilled to recover the alcohol and ester separately.

Having described the general process I will give an illustration of the method of operation with secondary butyl alcohol. I put in the reaction still, say ten volumes of acetic acid of about 75% strength, to this I add one to one and one-half volumes of secondary butyl alcohol and about 1.5% of concentrated sulphuric acid by volume on the total charge of esterification components. I then heat to boiling for about a half hour and then start distillation, when distillation commences, I again begin to feed to the reaction still secondary butyl alcohol and 75% acetic acid, in molecular proportions or in quantities corresponding to the amount of ester and alcohol and water which is being removed in the distillate. For each 100 pounds of secondary butyl alcohol added there is required 81.5 pounds of 75% acetic acid and 19.5 pounds water are produced from reaction in making 144.4 pounds of 85% ester. The total water including the water added with the acetic acid is 40 pounds and approximately this amount must be removed by the water separator, for each 100 pounds of alcohol added. The reflux is adjusted so that the temperature is controlled at about 83° C. to 86° C., at the top of the column, and water is removed from the water separator at a rate that maintains at all times the quantity of water in the reaction kettle approximately constant as corresponding to the condition that exists at the beginning of the run. By this means the operation may be continued day after day and all factors enumerated above are brought into proper correlation.

Using this method of operation I have been able to produce esters of an exceptional degree of purity at least equal to or above the usual commercial 85%, and with only the two distillations of generating and finishing. Moreover due to a scientific control I have been able to operate at a very high degree of efficiency with only slight losses due to distillation and practically none due to decomposition. For example using 75% acetic acid and secondary butyl alcohol the theoretical yield should be 144.4 pounds secondary butyl acetate of 85% ester for each 100 pounds of alcohol. I have been able to obtain 140 pounds of 85% ester from each 100 pounds of alcohol or an efficiency of 97%. This could be somewhat increased by recovery of uncondensed vapor during distillation. Likewise using 75% acetic acid and commercial 88% isopropyl alcohol the theoretical yield should be 135.3 pounds of 85% ester for each 100 pounds of isopropyl alcohol. I have been able to obtain 132 pounds of 85% isopropyl acetate from each 100 pounds of isopropyl alcohol, an efficiency of 97.5%. This efficiency likewise would be improved by recovery of uncondensed vapor during distillation. In both cases the efficiency, based on the acetic acid used corresponded to the efficiency based on the alcohol.

As a further illustration of the method of operation with isopropyl alcohol I put into the reaction still say ten volumes of acetic acid of about 75% strength, to this I add one and one-half volumes of commercial 88% isopropyl alcohol and about 2% of concentrated sulphuric acid by volume on the total charge of esterification components. I then heat to boiling for about a half hour and then start distillation, when distillation commences I begin feeding to the reaction still isopropyl alcohol and 75% acetic acid in molecular proportions and in quantities corresponding to the amount of ester, alcohol and water which is being removed in the distillate. For each 100 pounds of commercial 88% isopropyl alcohol there is required 90.2 pounds of 75% acetic acid and 20.3 pounds of water are produced from reaction in making 135.3 pounds of 85% isopropyl acetate. The total water including the water added with the acetic acid and alcohol is 54.7 pounds, and approximately this amount must be removed by the water separator for each 100 pounds of 88% isopropyl alcohol added.

As a further illustration of the method operation with secondary or primary amyl alcohol or with these in combination, I put into the reaction still say ten volumes of acetic acid of about 75% strength, and to this I add one and one-half volumes of amyl alcohol and about 1.5% of concentrated sulphuric acid by volume on the total charge of esterification components. I then heat to boiling for about one-half hour and then start distillation. When distillation commences I begin feeding to the reaction still amyl alcohol and 75% acetic acid in molecular proportions and in quantities corresponding to the amount of ester and alcohol and water which is being removed in the distillate. For each 100 pounds of amyl alcohol there is required 72 pounds of 75% acetic acid and 16.2 pounds of water are produced from reaction in making 130.2 pounds of 85% amyl acetate. The total water with the water added with the acetic acid is 34 pounds, and approximately this amount must be removed by the water separator for each 100 pounds of amyl alcohol added. In the case of amyl acetate however it will be found that the distillate carries over more than 34 pounds of water in each 130.2 pounds of 85% ester, and in order to control the strength of acetic acid in the reaction kettle constant, part of the water from the water separator must be fed back to the reaction kettle.

In order to explain the operation of the equipment necessary a drawing is shown in Figure I, of the design of the esterification equipment (including the primary distillation equipment, with its accessories).

A is the reaction kettle, B is a fractionating column, C is the condenser, D is the water separator, E is the neutralizing tanks, F is the alcohol feed tanks, G is the acid feed tank, H is a receiver for water separated and I is the valve control on the alcohol feed tank. 2 is the valve control on the acid feed tank, 3 is a flow meter on the alcohol feed, 4 is a flow meter on the acid feed, 5 is a flow meter on the condensate line to the neutralizing tanks, 6 is a flow meter on the reflux return line to the fractionating column, 7 is the reflux return control valve, 8 is a vent pipe, 9 is a recording thermometer on the fractionating column top, 10 is the control valve on water removed from the water separator, 11 is the control valve on return of water to the reaction kettle, 12 is a flow meter for the water separator, 13 is the steam coil in the reaction still and 14 is a flow meter on return water line to reaction still.

The alchohol and acetic acid are supplied to the reaction still from tanks F and G respectively through the flow meters 3 and 4 respectively. The steam is turned on through the steam coil 13. When distillation begins the vapors pass up the fractionating column B and are condensed in condenser C. The condensate flows to the water separator and the water separates into a bottom layer. The top or ester layer is partially fed back to the top of the fractionating column to maintain proper temperature control by means of the reflux return control 7, through the flow meter 6. The balance of the condensate flows through the flow meter 5 to the neutralizing tank E. The water is removed by means of control valve 10, through flow meter 12 into tank H, or is partly returned to the reaction still through control valve 11 when necessary.

My process is of general application and it will readily be apparent to one skilled in the art that methyl, ethyl, propyl and butyl esters of aliphatic acids may be prepared by a method entirely analogous to those described above. With regard to the preparation of esters of hydroxy aliphatic acids and dicarboxylic acids, it is pointed out that in the finishing or purification of these last named esters it is advisable to work in vacuum.

As used in the claims, mineral acids refer to sulphuric, hydrochloric, nitric and phosphoric acids.

As an additional step in the process use may be made of series stills and columns so that the distillate from the reaction still is fed continuously to this additional equipment for continuous finishing.

In the above specification, I have given, as an example, the use of five to ten volumes of the aliphatic acid, to one volume of the alcohol. These figures, of course, are illustrative and not limiting. Ratios of the order of 5:1 to 10:1 will hereinafter be included in the expression "a moderate excess" of the acid.

Having thus described my invention, what I claim as new and desire to protect by Letters Patent is:

1. A continuous method for producing esters which comprises reacting a moderate excess of a mono-carboxylic aliphatic acid with a monohydric alcohol in the presence of a small amount of a catalyst selected from the group consisting of mineral acids and acid salts the ratio of said aliphatic acid to alcohol being not substantially over 10:1, the reaction mixture also containing about 10 to 40% by volume of water, and thereafter removing from the reaction zone by distillation a product containing ester, alcohol and water, and feeding said aliphatic acid and said alcohol and water to said still, in such proportions as to replace the distillate as removed.

2. A continuous process for producing esters which comprises reacting a moderate excess of a mono-carboxylic aliphatic acid with a monohydric aliphatic alcohol in the presence of a small amount of catalyst selected from the group consisting of mineral acids and acid salts, the reaction mixture also containing about 10 to 40% by volume of water during the entire period of reaction, and thereafter removing from the reaction zone by distillation a raw distillate sufficiently rich in ester content, so that after separating water by stratification and neutralization, and a single subsequent distillation, a product is obtained which contains at least 85% ester.

3. A continuous method for producing esters which comprises reacting a moderate excess of a mono-carboxylic aliphatic acid with a monohydric alcohol in the presence of a small amount of a catalyst containing a mineral acid radical, the reaction mixture also containing a substantially constant large amount of water, and thereafter removing from the reaction zone by distillation, a product containing ester, alcohol and water.

4. A process of making esters which comprises reacting a moderate excess of an aliphatic monocarboxylic acid with an aliphatic monohydric alcohol in the presence of at least about 10% by volume of water, and in the presence of a catalyst selected from the group consisting of mineral acids and acid salts, until the resulting composition approximates equilibrium, distilling off a distillate containing a high ester content and continuously feeding into the still a feed mixture of said acid, alcohol and water corresponding approximately in composition to the distillate withdrawn from the system.

5. A continuous process of preparing esters comprising reacting five to ten volumes of an aliphatic carboxylic acid with one volume of an aliphatic alcohol in the presence of a small amount of a catalyst selected from the group consisting of mineral acids and acid salts, continuously adding the said acid and alcohol to the reaction mass in amounts about equal to theoretically reacting proportions, maintaining a large amount of water at a constant value in the reaction mass, by continuously removing the water formed by the esterification reaction and continuously removing the ester formed.

6. A continuous process of preparing esters comprising reacting five to ten volumes of an aliphatic carboxylic acid with one volume of an aliphatic alcohol in the presence of .7% to 3% by volume sulphuric acid calculated on the total amount of reaction mass, continuously adding the said aliphatic carboxylic acid and alcohol to the reaction mass in amounts about equal to theoretically reacting proportions, maintaining a constant amount of water in the reaction mass equal to from 10 to 40% of the total volume by continuously removing the water formed by the esterification reaction, maintaining the alcohol and acid in contact with each other for a sufficient period of time to effect a high degree of esterification and removing the ester formed.

7. A process as set forth in claim 2 in which secondary butyl alcohol is reacted with acetic acid to form secondary butyl acetate.

8. A process as set forth in claim 1 in which a butyl alcohol is reacted with acetic acid to from a butyl acetate.

9. A process as set forth in claim 1 in which isopropyl alcohol is reacted with acetic acid to form isopropyl acetate.

10. A process as set forth in claim 2 in which a propyl alcohol is reacted with acetic acid to from a propyl acetate.

11. A process as set forth in claim 1 in which secondary amyl alcohol is reacted with acetic acid and to form secondary amyl acetate.

12. A process as set forth in claim 4 in which an amyl alcohol is reacted with acetic acid to form amyl acetate.

13. A continuous process of preparing esters comprising reacting five to ten volumes of an aliphatic carboxylic acid with one volume of a secondary aliphatic alcohol in the presence of 0.7% to 3% by volume sulphuric acid calculated on the total amount of reaction mass, continuously adding the said acid and alcohol to the reaction mass in amounts equal to about theoretically reacting proportions, maintaining a constant amount of water in the reaction mass equal to from 10 to 40% of the total volume, maintaining the acid and alcohol in contact with each other for a sufficient period of time to effect a degree of esterification equal at least to 85% of the theoretical amount and continuously removing the esters formed.

14. A continuous process of preparing esters comprising reacting five to ten volumes of an aliphatic carboxylic acid with one volume of an aliphatic alcohol for sufficient time in the presence of a catalyst in sufficient concentration to obtain a high degree of esterification, said catalyst being selected from the group of mineral acids and acid salts, said catalyst being present in an amount which is inversely proportional to the strength of said aliphatic carboxylic acid, continuously adding the said aliphatic carboxylic acid and said alcohol to the reaction mass in amounts about equal to theoretically reacting proportions, maintaining a large and substantially constant amount of water in the reaction mass and continuously removing the ester formed.

15. A continuous process of preparing esters comprising reacting five to ten volumes of an aliphatic carboxylic acid with one volume of an aliphatic alcohol in the presence of .7% to 3% by volume of sulphuric acid calculated on the total amount of reaction mass and being present in an amount which is inversely proportional to the strength of said aliphatic carboxylic acid, continuously adding the said aliphatic carboxylic acid and said alcohol to the reaction mass in amounts about equal to theoretically reacting proportions, maintaining a constant volume of water in the reaction mass equal to 10% to 40% of the total mass by volume, and maintaining the aliphatic carboxylic acid and alcohol in contact with each other for sufficient time to promote at least 85% esterification.

16. A process of making esters which comprises reacting an excess of an aliphatic monocarboxylic acid with an aliphatic monohydric alcohol and water until the resulting composition approximates the equilibrium composition, distilling off a distillate containing a higher ester content than that occurring in the corresponding ternary azeotrope and continuously feeding into the still a feed mixture of said acid, alcohol and water corresponding in composition to the distillate withdrawn from the system.

17. A continuous process for preparing esters comprising reacting about six volumes of a lower aliphatic carboxylic acid with one volume of a lower aliphatic monohydric alcohol for sufficient time and in the presence of a strong mineral acid catalyst in sufficient concentration to obtain a high degree of esterification, continuously adding the said aliphatic carboxylic acid and said alcohol to the reaction mass in amounts about equal to theoretically reacting proportions together with water, distilling, fractionating the distillate and continuously removing the ester formed by condensation and stratification.

18. A continuous process for preparing esters comprising reacting about six volumes of a lower fatty acid with one volume of a lower aliphatic secondary alcohol in the presence of a small amount of sulfuric acid until the resulting composition approximates equilibrium conditions, continuously adding a mixture comprising said fatty acid, said alcohol and water, distilling and continuously removing the ester formed.

19. A continuous process for producing esters which comprises reacting about six volumes of acetic acid with one volume of a lower aliphatic secondary alcohol in the presence of a catalytic amount of sulfuric acid until the resulting composition approximates equilibrium conditions, continuously adding acetic acid and said alcohol in about theoretically reacting proportions and water sufficient to give a distillate having a higher ester content than the corresponding azeotrope, distilling and continuously removing the ester formed.

20. A continuous process for producing esters which comprises reacting about six volumes of acetic acid with one volume of secondary butyl alcohol in the presence of a small amount of sulfuric acid as the catalyst for a time sufficient to produce a reaction mixture which approximates equilibrium conditions, then continuously feeding in a mixture to said reaction mixture comprising substantially stoichiometrical amounts of acetic acid and secondary butyl alcohol, distilling and continuously removing the ester formed.

21. A process for making esters of aliphatic secondary monohydric alcohols comprising forming a reaction mixture of five to ten volumes of dilute aliphatic monocarboxylic acid to one volume of alcohol, distilling said reaction mixture in the presence of 1% to 3% of sulfuric acid, continuously adding a mixture of said dilute organic acid and alcohol in substantially equimolecular portions, fractionating the distillate and condensing and stratifying whereby an ester fraction of greater than 80% ester content is separated.

22. A process of making esters of aliphatic secondary monohydric alcohols comprising forming a reaction mixture of between about 5 to about 10 volumes of acetic acid containing from 10% to 20% water to one volume of secondary butyl alcohol, distilling said reaction mixture in the presence of 1% to 3% of a highly ionizable mineral acid, fractionating the distillate, distilling and removing the ester formed, and continuously adding a mixture of said acetic acid and alcohol to said reaction mixture to compensate for the ester and water withdrawn.

JOSEPH F. HARRINGTON.

---

CERTIFICATE OF CORRECTION.

Patent No. 2,147,341.  February 14, 1939.

JOSEPH F. HARRINGTON.

It is hereby certified that error appears in the above numbered patent requiring correction as follows: In the drawing, for the legend "Alcohol Feed Tank" designating tank A read Still; and for the legend "Reaction catalyst" designating tank F read Alcohol Feed Tank; and that the said Letters Patent should be read with this correction therein that the same may conform to the record of the case in the Patent Office.

Signed and sealed this 11th day of April, A. D. 1939.

Henry Van Arsdale
Acting Commissioner of Patents.

(Seal)

and water until the resulting composition approximates the equilibrium composition, distilling off a distillate containing a higher ester content than that occurring in the corresponding ternary azeotrope and continuously feeding into the still a feed mixture of said acid, alcohol and water corresponding in composition to the distillate withdrawn from the system.

17. A continuous process for preparing esters comprising reacting about six volumes of a lower aliphatic carboxylic acid with one volume of a lower aliphatic monohydric alcohol for sufficient time and in the presence of a strong mineral acid catalyst in sufficient concentration to obtain a high degree of esterification, continuously adding the said aliphatic carboxylic acid and said alcohol to the reaction mass in amounts about equal to theoretically reacting proportions together with water, distilling, fractionating the distillate and continuously removing the ester formed by condensation and stratification.

18. A continuous process for preparing esters comprising reacting about six volumes of a lower fatty acid with one volume of a lower aliphatic secondary alcohol in the presence of a small amount of sulfuric acid until the resulting composition approximates equilibrium conditions, continuously adding a mixture comprising said fatty acid, said alcohol and water, distilling and continuously removing the ester formed.

19. A continuous process for producing esters which comprises reacting about six volumes of acetic acid with one volume of a lower aliphatic secondary alcohol in the presence of a catalytic amount of sulfuric acid until the resulting composition approximates equilibrium conditions, continuously adding acetic acid and said alcohol in about theoretically reacting proportions and water sufficient to give a distillate having a higher ester content than the corresponding azeotrope, distilling and continuously removing the ester formed.

20. A continuous process for producing esters which comprises reacting about six volumes of acetic acid with one volume of secondary butyl alcohol in the presence of a small amount of sulfuric acid as the catalyst for a time sufficient to produce a reaction mixture which approximates equilibrium conditions, then continuously feeding in a mixture to said reaction mixture comprising substantially stoichiometrical amounts of acetic acid and secondary butyl alcohol, distilling and continuously removing the ester formed.

21. A process for making esters of aliphatic secondary monohydric alcohols comprising forming a reaction mixture of five to ten volumes of dilute aliphatic monocarboxylic acid to one volume of alcohol, distilling said reaction mixture in the presence of 1% to 3% of sulfuric acid, continuously adding a mixture of said dilute organic acid and alcohol in substantially equimolecular portions, fractionating the distillate and condensing and stratifying whereby an ester fraction of greater than 80% ester content is separated.

22. A process of making esters of aliphatic secondary monohydric alcohols comprising forming a reaction mixture of between about 5 to about 10 volumes of acetic acid containing from 10% to 20% water to one volume of secondary butyl alcohol, distilling said reaction mixture in the presence of 1% to 3% of a highly ionizable mineral acid, fractionating the distillate, distilling and removing the ester formed, and continuously adding a mixture of said acetic acid and alcohol to said reaction mixture to compensate for the ester and water withdrawn.

JOSEPH F. HARRINGTON.

---

CERTIFICATE OF CORRECTION.

Patent No. 2,147,341.      February 14, 1939.

JOSEPH F. HARRINGTON.

It is hereby certified that error appears in the above numbered patent requiring correction as follows: In the drawing, for the legend "Alcohol Feed Tank" designating tank A read Still; and for the legend "Reaction catalyst" designating tank F read Alcohol Feed Tank; and that the said Letters Patent should be read with this correction therein that the same may conform to the record of the case in the Patent Office.

Signed and sealed this 11th day of April, A. D. 1939.

Henry Van Arsdale
Acting Commissioner of Patents.

(Seal)